(12) United States Patent
Leclaire et al.

(10) Patent No.: US 6,723,377 B2
(45) Date of Patent: Apr. 20, 2004

(54) METHOD FOR INCORPORATING AN ADDITIVE INTO A THIN FILM FORMED ON A SUBSTRATE

(75) Inventors: Yves Leclaire, Combs la Ville (FR); Jean-Paul Cano, Chennevières sur Marne (FR)

(73) Assignee: Essilor International Compagnie Generale d'Optique, Charenton cedex (FR)

( * ) Notice: Subject to any disclaimer, the term of this patent is extended or adjusted under 35 U.S.C. 154(b) by 113 days.

(21) Appl. No.: 10/057,472

(22) Filed: Jan. 25, 2002

(65) Prior Publication Data

US 2003/0020869 A1 Jan. 30, 2003

(30) Foreign Application Priority Data

Jan. 25, 2001 (FR) .............................. 01 01028

(51) Int. Cl.$^7$ ................................ B05D 5/06
(52) U.S. Cl. .................. 427/165; 427/164; 427/240; 427/299; 427/331; 427/385.5; 427/389.7; 427/393.5; 427/407.1; 427/407.2
(58) Field of Search ................ 427/164, 165, 427/240, 299, 331, 385.5, 389.7, 393.5, 407.1, 407.2

(56) References Cited

U.S. PATENT DOCUMENTS

| 4,146,658 A | 3/1979 | Humphrey .................. 427/160 |
| 5,316,791 A | 5/1994 | Farber et al. ............... 427/464 |

*Primary Examiner*—Bernard Pianalto
(74) *Attorney, Agent, or Firm*—Fulbright & Jaworski L.L.P.

(57) ABSTRACT

The present invention relates to methods of incorporating additives into a thin film formed on a substrate comprising:
- forming an impregnatable thin film on at least one face of a substrate;
- depositing an impregnation composition comprising at least one additive incorporated in an appropriate diluent medium on said impregnatable thin film by spin coating;
- diffusing the impregnation composition within said impregnatable thin film and;
- treating the substrate coated with the impregnated thin film to at least partially remove the diluent medium from the impregnated thin film.

The invention also relates to the application of such methods to the production of optical lenses, including in the coloring of such lenses.

19 Claims, 1 Drawing Sheet

METHOD FOR INCORPORATING AN ADDITIVE INTO A THIN FILM FORMED ON A SUBSTRATE

BACKGROUND OF THE INVENTION

The present application claims priority to French Application No. 01/01028 filed Jan. 25, 2001, the entire text of which is specifically incorporated by reference herein without disclaimer.

1. Field of the Invention

The present invention relates in general terms to a method for incorporating additives, and in particular pigments and/or dyes, into thin films, and to the use of this method for incorporating additives into ophthalmic lenses, in particular for colouring these ophthalmic lenses.

The invention also covers the ophthalmic lenses thus obtained.

2. Description of Related Art

Ophthalmic lenses made from organic materials are most often coloured in the bulk of the material by dipping in aqueous coloration baths, heated to temperatures of the order of 90° C. and in which the pigments have been dispersed. The pigments thus diffuse under the surface of the substrate and the colour density is obtained with a quantity of the pigment having diffused into the body of the substrate.

These coloration operations are delicate since they depend on the affinity between the pigment and the material constituting the substrate.

Since ophthalmic lenses are composed of several different materials, each of a different nature, it is necessary to adapt the treatment for each of these, which is costly in terms of time and personnel assigned to the task. This is rendered even more difficult when it is desired to obtain colours requiring the penetration of several pigments and the treatment may need to be repeated several times after visual checking by operators.

Ophthalmic lenses are conventionally coated with an anti-scratch coating. It is known that various additives (pigments, UV absorbers) may be incorporated into the anti-scratch coating compositions before their application and hardening on one face of the ophthalmic lens. However, the incorporation of additives, in particular pigments, affects the properties of the anti-scratch coating.

Coatings which may be coloured after hardening are also known, using a dipping coloration method identical to that referred to for colouring the base substrates. The problems which arise are thus identical to those for the base substrates, because of the multiplicity of coatings, in particular anti-scratch coatings, used in the ophthalmic optics field.

It would thus be desirable to have access to a method which is rapid, reproducible and applicable to any type of substrate, whatever the material it is composed of.

In addition, such a method should allow production of the whole range of coloration, from the lightest colour (colour A) to the darkest (colour C).

The object of the invention is thus to solve these problems.

SUMMARY OF THE INVENTION

According to the invention, these objectives are achieved by a new method for incorporating at least one additive into a thin film formed on a substrate and comprising the following steps (a) forming an impregnatable thin film on at least one face of the substrate;
(b) depositing an impregnation composition comprising at least one additive incorporated in an appropriate diluent medium on said impregnatable thin film by spin coating;
(c) diffusing the impregnation composition within said thin film and;
(d) treating the substrate coated with the impregnated thin film to at least partially remove the diluent medium from it.

The method according to the invention is particularly intended for the production of ophthalmic lenses but may find other useful applications.

By "impregnatable thin film" according to the invention, should be understood a film with thickness generally less than 5 $\mu$m and composed of a material which allows the penetration into itself, by diffusion, of the additive(s) contained in the impregnation composition.

The impregnatable thin film preferably has a thickness of 0.5 to 2 $\mu$m, typically of the order of 1 $\mu$m.

The impregnatable thin film according to the invention may be composed of any material able to incorporate within itself, by diffusion, the additive(s) to be incorporated.

The material of the impregnatable thin films according to the invention is preferably an optically transparent material.

The material of the impregnatable thin film according to the invention is generally a polymeric material and preferably obtained from a latex.

As is well known, the latexes are dispersions of polymers in an aqueous phase.

Any type of latex, such as the poly(meth)acrylic latexes, the poly(meth)acrylic-styrene latexes and the polyurethane latexes may be used in the method of the invention.

The preferred latexes are the polyurethane latexes such as those disclosed in the European patent EP-0.680.492.

The impregnatable thin film according to the invention may be formed by any conventional known method. The formation of the impregnatable thin film may in particular be achieved by depositing a solution and/or dispersion of the impregnatable material on one or more faces of the substrate and drying this solution and/or dispersion to form the impregnatable thin film.

The deposit of the solution and/or dispersion of the impregnatable material may for example be achieved by dipping the substrate in the solution and/or dispersion, or, preferably, by depositing a solution and/or dispersion by spin coating.

The drying to obtain the thin film according to the invention may be carried out at ambient temperature or by heating, for example infrared heating or in an oven.

The substrate may be any substrate to which a thin film according to the invention will adhere. The substrate may in particular be an optically transparent material such as an organic or inorganic glass.

By substrate, in the sense of the present invention, should be understood an uncoated substrate or an already coated substrate, such as an ophthalmic lens optionally already coated. The thin film according to the invention is preferably applied to an uncoated substrate.

The impregnation composition according to the invention is a composition which contains at least one additive to be incorporated in an appropriate diluent medium.

The additives which may be incorporated include the dyes, the pigments, the plastifiers, the UV absorbers and the photochromic compounds. The preferred additives are dyes, pigments, and photochromic compounds.

The impregnation composition may be a solution and/or a dispersion of the additive to be incorporated.

The diluent medium is preferably a solvent, at least a partial solvent, of the additive(s) to be incorporated. More preferably, the diluent medium is a solvent of the additive(s) to be incorporated and the impregnation composition is a solution.

The solvent of the impregnation composition is optionally a solvent for swelling the material of the thin film, so as to facilitate the diffusion of the additive(s) within the thin film.

Also preferably, the impregnation composition is a solution and/or a dispersion of one or more dye(s), pigment(s) or photochromic compound(s).

As stated above, the impregnation composition is deposited by spin coating on the impregnatable thin film, which gives a film of the impregnation composition of uniform thickness, and in particular in the case of coloration solutions, a homogeneous coloration of the impregnatable thin film.

The film of the impregnation composition is then absorbed by the impregnatable thin film.

After impregnation of the thin film by the impregnation composition, the substrate coated with the impregnated thin film is dried, for example by infrared heating or in an oven.

The impregnation composition preferably contains an agent for retaining the additive, in other words a compound which has the effect of preventing the retrodiffusion of the additive towards the surface, in particular towards other films which might optionally be added to the impregnatable thin film, for example an anti-scratch coating in the case of an application to ophthalmic lenses.

In the case of an impregnatable thin film formed from a crosslinkable polymer, the retention agent is preferably a crosslinking agent or one which increases the crosslinking of the polymer.

Thus, in the case of an impregnatable thin film of polyurethane latex, the impregnation composition could contain a crosslinking agent which is an epoxyalkoxysilane hydrolysate, preferably an epoxytrialkoxysilane hydrolysate, and in particular γ-glycidoxypropyltrimethoxysilane (GLYMO). These epoxyalkoxysilanes hydrolysates are known in the art and are disclosed among others in the patent FR 2.702.486.

The concentration of crosslinking agent in the impregnation composition is generally less than 25% by weight, preferably less than 20%, and even better less than 10% by weight.

The impregnation composition, when it contains a crosslinking agent, may also contain a hardening agent. In the case of an impregnation composition containing an epoxyalkoxysilane hydrolysate as crosslinking agent, the hardening agent is preferably an aluminium chelate, and especially aluminium acetylacetonate.

The use of a crosslinking agent and optionally a hardening agent in the impregnation compositions, when the thin film is a crosslinkable polymer, has the advantage of making the thin film resistant to solvent attack and preventing the retrodiffusion of the additive towards the surface.

This is important, particularly when a subsequent coating such as an anti-scratch coating is added. The composition for an anti-scratch coating generally contains an organic solvent when can, during the deposition, diffuse into the thin film and extract the additive if the thin film, for example a latex, does not contain a crosslinking agent.

Within the scope of the present invention, any anti-scratch coating conventionally used, in particular in the ophthalmic optics field, may be used. The preferred anti-scratch coatings are the anti-scratch coatings based on silane hydrolysates, in particular the epoxysilane hydrolysate such as that disclosed in the French patent FR 2.702.486 and the patent U.S. Pat. No. 4,211,823.

Obviously, it is also possible for other coatings conventionally used in the ophthalmic optics field, such as shock-proof and anti-reflection coatings, to be deposited onto the thin film according to the invention.

Other attractive aspects of the invention will be evident in the following description of an embodiment of the invention, described by way of a single non-limiting example, which refers to the annexed figures which schematically illustrate the principal steps of the method.

DESCRIPTION OF ILLUSTRATIVE EMBODIMENTS

Figure 1:
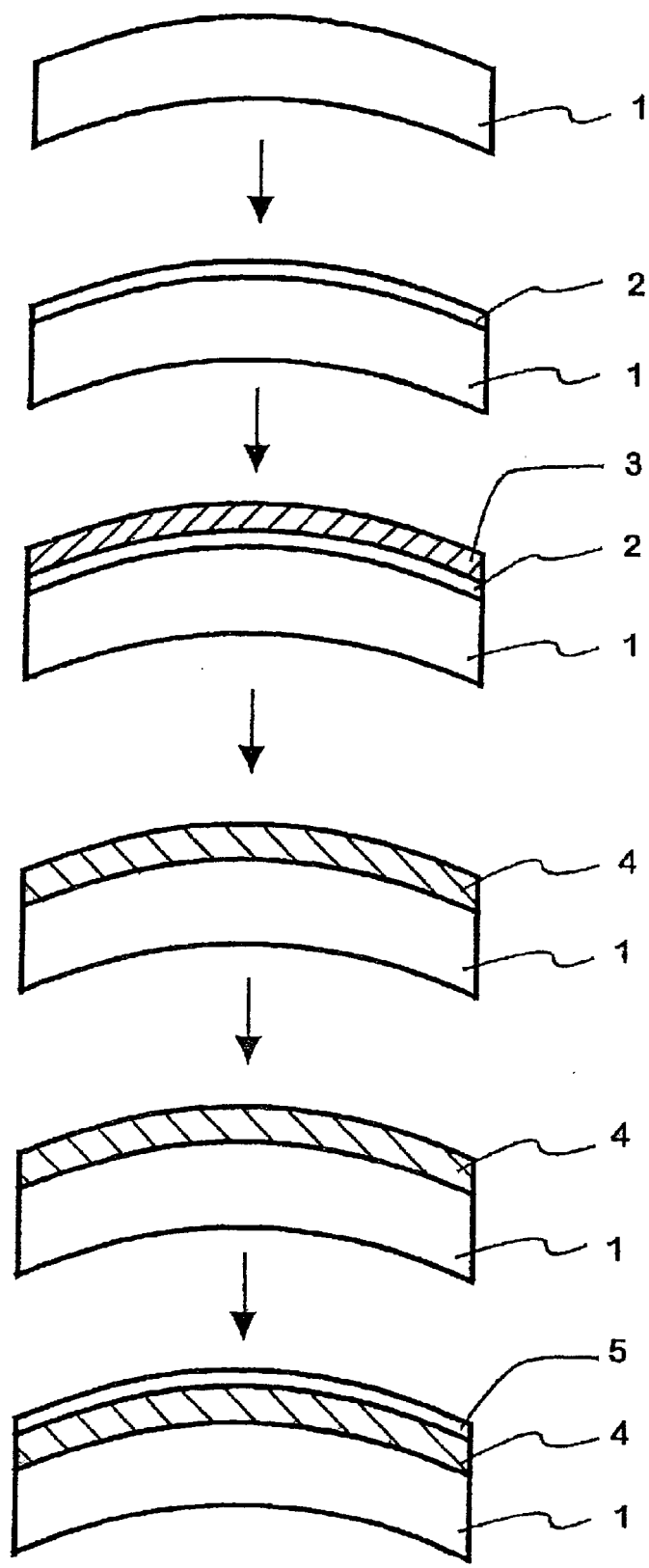
FIG. 1. Application of the method according to the invention to the coloration of an ophthalmic lens, for example one made from polycarbonate, or from poly (diethylene glycol bisallyl carbonate).

As shown in FIG. 1, the first step of the methods of the invention consists of depositing a film of a latex, for example a polyurethane latex, on one face of the lens 1, for example by spin coating or by dipping, then drying this polyurethane latex film, for example at ambient temperature, to obtain the impregnatable thin film 2, for example of thickness 1 micrometer.

A film of a dye solution 3 is then deposited on the impregnatable thin film 2, by spin coating.

The deposit by spin coating of the dye solution gives a deposit of approximately uniform thickness and thus a homogeneous coloration to the impregnatable thin film.

The deposited dye solution is then diffused into the impregnatable thin film, so as to give a coloured thin film 4 which is then dried in an oven, for example for 15 minutes at 100° C. Infrared heating is also possible.

A deposit of an anti-scratch coating 5 may then optionally be added; this deposit may be performed conventionally by centrifugation or optionally by dipping.

The following examples illustrate the present invention. In the examples, except where otherwise stated, all parts and percentages are by weight.

EXAMPLES 1 to 7

Plane Orma® lenses from the ESSILOR Company (poly (diethylene glycol bis(allylcarbonate))), were coloured using the method of the invention. 5 Lenses per test were used for each dye solution.

1. Deposit of the Impregnatable Thin Film:

In all cases, the impregnatable thin film was formed by spin coating deposition of a polyurethane primer (W234 from the Baxenden Company diluted to 55% in water) on one face of the lenses.

2 ml of latex was deposited from the centre to the edge of the rotating lens (rotation speed: 500 r.p.m.) in 5 seconds. The rotation speed of the lens was then increased to 1500 r.p.m., so that the latex film reached a uniform thickness, and this rotation was maintained for 10 seconds. The rotation was then stopped and the impregnatable thin film was dried at 60° C. for 15 minutes in an oven.

2. Preparation of the Dye Solutions:

4 or 5 grams of dye were dissolved in 100 grams of solvent, with the optional addition to this solution of a hydrolysate of γ-glycidoxypropyltrimethoxysilane (Glymo)

prepared by mixing 100 grams of Glymo with 22.9 grams of 0.1 N HCl, and optionally aluminium acetylacetonate (Al (acac)$_3$) as hardening agent.

The dye solutions obtained were filtered through a pleated filter, then deposited on the impregnatable thin films.

The compositions of the dye solutions are given in table I below:

TABLE I

| | Dye solutions (g) | | | | | | |
|---|---|---|---|---|---|---|---|
| | 1 | 2 | 3 | 4 | 5 | 6 | 7 |
| Dye | | | | | | | |
| Blue Orasol GN | 3.6 | 3.6 | — | — | — | — | — |
| Blue Savinyl RS | — | — | 3.6 | 3.6 | 4.5 | 4.5 | 4.5 |
| Solvent | | | | | | | |
| Acetone | 86.4 | 86.4 | 86.4 | 86.4 | 85.5 | 85.5 | 85.5 |
| Crosslinking agent | | | | | | | |
| Hydrolysed Glymo | — | 10 | — | 10 | — | 10 | 10 |
| Hardening agent | | | | | | | |
| Al(acac)$_3$ | — | 3.26 | — | 3.26 | — | 3.26 | — |

3. Deposit of the Dye Solutions:

2 ml of each dye solution were deposited by spin coating on the impregnatable thin film, proceeding from the centre to the edge of the lens. This initial deposit was performed over 5 seconds with a rotation speed of 500 r.p.m. The rotation speed was then accelerated to 1500 r.p.m. and the lens was maintained in rotation at this speed for 20 seconds to ensure uniform thickness and evaporate the solvents. When the deposit was completed, the lenses were placed in an oven at 100° C. for 1 hour, then removed and let cool at ambient temperature for about 30 minutes.

4. Deposit of the Anti-Scratch Varnish:

After cooling, 2 ml of a conventional polysiloxane varnish were deposited on the coloured thin films by spin coating (the speed during deposit being 500 r.p.m.), so as to protect the substrate and the coloured thin film.

The lenses were maintained at this rotation speed of 500 r.p.m. for 10 seconds, then the speed was accelerated to 1500 r.p.m. for 10 seconds, to ensure uniform deposit thickness.

Once the deposits were completed, the lenses were placed in an oven for 3 hours at 100° C., so as to polymerize the anti-scratch varnish.

The above operations could optionally be performed on the second face of the lens, according to the coloration intensity desired.

The anti-scratch varnish used in the examples was prepared by adding 80.5 parts of 0.1N hydrochloric acid drop by drop to a solution containing 224 parts of Glymo and 120 parts of dimethyldiethoxysilane.

The hydrolysed solution was stirred for 24 hours at ambient temperature, then 718 parts of colloidal silica 30% in methanol, 15 parts of aluminium acetylacetonate and 44 parts of ethylcellosolve were added.

A small quantity of a surface-active agent was added.

The optical transmission (Tv) of the coloured lenses obtained before and after varnishing with the anti-scratch varnish was measured.

The transmission levels Tv were measured with a Hazegard apparatus from the Garner Company, with illuminant C, according to the standard ANSI Z 80-3-1996.

They could also be performed with a conventional spectrocolorimeter, in which case the standard applicable is ISO 8980, part 3.

For comparison, the transmission level for an ORMA® lens coated with the above coating, but with no other treatment, was 92.2%.

For each dye solution, the transmission value given is the mean for 5 lenses.

The results are given in table II below:

TABLE II

| Ex. n° | Solution | Tv before varnishing | Tv after varnishing | Δ |
|---|---|---|---|---|
| 1 | 1 | 64.18 | 88.06 | 23.88 |
| 2 | 2 | 61.52 | 63.6 | 1.8 |
| 3 | 3 | 45.94 | 67.78 | 21.84 |
| 4 | 4 | 47.18 | 47.18 | 0 |
| 5 | 5 | 34.32 | 53.46 | 19.14 |
| 6 | 6 | 36.1 | 35.24 | 0.14 |
| 7 | 7 | 33.26 | 42.66 | 9.4 |

The results show that intensely coloured lenses were obtained. In addition, it can be seen that the use of a crosslinking agent and optionally a hardening agent in the dye solution led to exceptionally good retention of the coloration of the coloured thin film, even when an anti-scratch coating was applied.

The method of incorporating additives according to the invention has many advantages.

This method of incorporating additives is firstly independent of the nature of the substrate, since the coloration is performed in a thin film deposited on the substrate. It is thus possible to treat any organic substrate, in particular polycarbonate substrates which are very sensitive to solvent attack, but also inorganic glass substrates.

The method is reproducible and the coloration level is easy to control, since it depends on parameters defined in advance such as the thickness of the impregnatable thin film, and the concentration of additives in the impregnation solution.

The method of incorporating additives according to the invention, in particular dyes, is quicker than the techniques in the prior art.

The method of the invention is particularly intended for the coloration of ophthalmic lenses, and enables denser colorations to be obtained than with the methods in the prior art.

Obviously the invention is not limited to the details of the method described above by way of a single example and may, in particular, comprise other steps or be subject to variations, while still remaining within the scope of the protection defined by the claims.

Moreover, the invention is particularly applicable to the production of ophthalmic lenses and also covers the lenses thus obtained, but may have other applications in situations where it is advantageous to coat a substrate with a thin film into which an additive is incorporated.

What is claimed is:

1. A method for incorporating at least one additive into a thin film formed on a substrate comprising:

forming an impregnatable thin film on at least one face of a substrate;

depositing an impregnation composition comprising at least one additive incorporated in an appropriate diluent medium on said impregnatable thin film by spin coating;

diffusing the impregnation composition within said impregnatable thin film and;

treating the substrate coated with the impregnated thin film to at least partially remove the diluent medium from the impregnated thin film.

2. The method of claim 1, wherein treating the substrate coated with the impregnated thin film to at least partially remove the diluent medium from the impregnated thin film comprises a thermal treatment.

3. The method of claim 1, wherein the formation of said thin film comprises the deposit on at least said face of the substrate of a precursor material by dipping or spin coating.

4. The method of claim 1, wherein the precursor material of said thin film is a polymer composition.

5. The method of claim 4, wherein the polymer composition is a latex.

6. The method of claim 5, wherein the latex is a polyurethane latex.

7. The method of claim 4, wherein the impregnation composition also contains an agent for crosslinking the polymer composition.

8. The method of claim 7, wherein the crosslinking agent is an epoxyalkoxysilane hydrolysate, preferably an epoxytrialkoxysilane hydrolysate.

9. The method of claim 8, wherein the epoxytrialkoxysilane is γ-glycidoxypropyltrimethoxysilane.

10. The method of claim 7, wherein the impregnation composition also contains a hardening agent.

11. The method of claim 10, wherein the hardening agent is an aluminium chelate, preferably aluminium acetylacetonate.

12. The method of claim 1, wherein the substrate is an inorganic glass or an organic glass.

13. The method of claim 12, wherein the organic glass is a polycarbonate glass.

14. The method of claim 1, wherein the additive or additives are selected from the pigments, the UV absorbers, the dyes, the photochromic compounds and the plastifiers, preferably from the pigments, the dyes and the photochromic compounds.

15. The method of claim 1, wherein the substrate is uncoated or already coated.

16. The method of claim 1, wherein the substrate is an ophthalmic lens.

17. The method of claim 1, further comprising depositing an anti-scratch coating on the impregnated thin film.

18. The method of claim 17, wherein the deposit of the anti-scratch coating is performed by dipping or by spin coating.

19. The method of claim 1, further defined as a method for the coloration of ophthalmic lenses.

* * * * *

UNITED STATES PATENT AND TRADEMARK OFFICE
CERTIFICATE OF CORRECTION

PATENT NO.   : 6,723,377 B2
DATED        : April 20, 2004
INVENTOR(S)  : Yves Leclaire and Jean-Paul Cano It is certified that error appears in the above-identified patent and that said Letters Patent is hereby corrected as shown below:

Title page,
Item [54], Title, after "SUBSTRATE" please insert -- AND USES THEREOF IN OPHTHALMIC OPTICS -- therefor.

Signed and Sealed this

Ninth Day of November, 2004

JON W. DUDAS
*Director of the United States Patent and Trademark Office*